(12) United States Patent
Snyder

(10) Patent No.: US 9,693,507 B1
(45) Date of Patent: Jul. 4, 2017

(54) HEDGE TRIMMING-CARRIAGE AND APPARATUS

(71) Applicant: Peter Snyder, Lorida, FL (US)

(72) Inventor: Peter Snyder, Lorida, FL (US)

( * ) Notice: Subject to any disclaimer, the term of this patent is extended or adjusted under 35 U.S.C. 154(b) by 51 days.

(21) Appl. No.: 14/923,600

(22) Filed: Oct. 27, 2015

(51) Int. Cl.
*A01G 3/04* (2006.01)

(52) U.S. Cl.
CPC .................. *A01G 3/0417* (2013.01)

(58) Field of Classification Search
CPC ....... A01G 3/04; A01G 3/0417; A01G 3/0435
USPC .......................................... 56/234, 237, 233
See application file for complete search history.

(56) References Cited

U.S. PATENT DOCUMENTS

| 2,762,186 A | | 9/1956 | Janata | |
|---|---|---|---|---|
| 3,597,908 A | | 8/1971 | Grossman | |
| 3,703,803 A | | 11/1972 | McClure | |
| 3,805,501 A | * | 4/1974 | Cole | A01G 3/0417 56/237 |
| 3,961,468 A | * | 6/1976 | Brown | A01G 3/0417 30/380 |
| 4,174,604 A | * | 11/1979 | Wilson, Sr. | A01G 3/0417 56/237 |
| 5,107,592 A | * | 4/1992 | Downey | A01G 3/0417 30/379.5 |
| 6,009,695 A | * | 1/2000 | Karas | A01G 3/0417 56/16.7 |
| 6,715,272 B2 | | 4/2004 | Stahl | |
| 7,093,366 B2 | * | 8/2006 | Black | A01G 3/053 16/427 |
| D596,000 S | | 7/2009 | Klingbeil | |
| 7,652,766 B2 | | 1/2010 | Pellenc | |

FOREIGN PATENT DOCUMENTS

| DE | 4121132 A1 | * | 1/1993 | ............. F16M 11/24 |
|---|---|---|---|---|
| DE | 4341892 A1 | * | 6/1994 | .......... A01G 3/0417 |
| DE | 102010037792 A1 | * | 4/2009 | |
| EP | 2206425 A1 | | 7/2010 | |
| FR | 2587585 A2 | * | 9/1985 | |
| FR | 2843275 A2 | * | 9/2002 | |
| FR | 3000640 A2 | * | 1/2013 | |
| GB | 2150804 A | * | 7/1985 | .......... A01G 3/0417 |

* cited by examiner

*Primary Examiner* — John G Weiss
(74) *Attorney, Agent, or Firm* — Kyle A. Fletcher, Esq.

(57) ABSTRACT

The hedger trimming carriage and apparatus is a frame that is designed to be mounted on a vehicle. The frame of the hedger trimming carriage and apparatus is designed to carry during operation a hedger that is used to trim bushes and shrubbery while the vehicle is in motion. The hedger trimming carriage and apparatus comprises a mounting frame, a first hedger apparatus, and as second hedger apparatus.

13 Claims, 5 Drawing Sheets

HEDGE TRIMMING-CARRIAGE AND APPARATUS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of racks for supporting agricultural implements, more specifically, a rack to mount and operate hedge trimmers on a vehicle.

SUMMARY OF INVENTION

The hedger trimming carriage and apparatus is a frame that is designed to be mounted on a vehicle. The frame of the hedger trimming carriage and apparatus is designed to carry during operation a hedger that is used to trim bushes and shrubbery while the vehicle is in motion.

These together with additional objects, features and advantages of the hedger trimming carriage and apparatus will be readily apparent to those of ordinary skill in the art upon preferred, but nonetheless illustrative, embodiments when taken in conjunction with the accompanying drawings.

In this respect, before explaining the current embodiments of the hedger trimming carriage and apparatus in detail, it is to be understood that the hedger trimming carriage and apparatus is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hedger trimming carriage and apparatus.

It is therefore important that the claims be regarded as including such equivalent construction insofar as they do not depart from the spirit and scope of the hedger trimming carriage and apparatus. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description meant to be exemplary illustrations provided to enable persons skilled in the art to practice the disclosure and are not intended to limit the scope of the appended claims.

DETAILED DESCRIPTION OF THE EMBODIMENT

Figure 1:
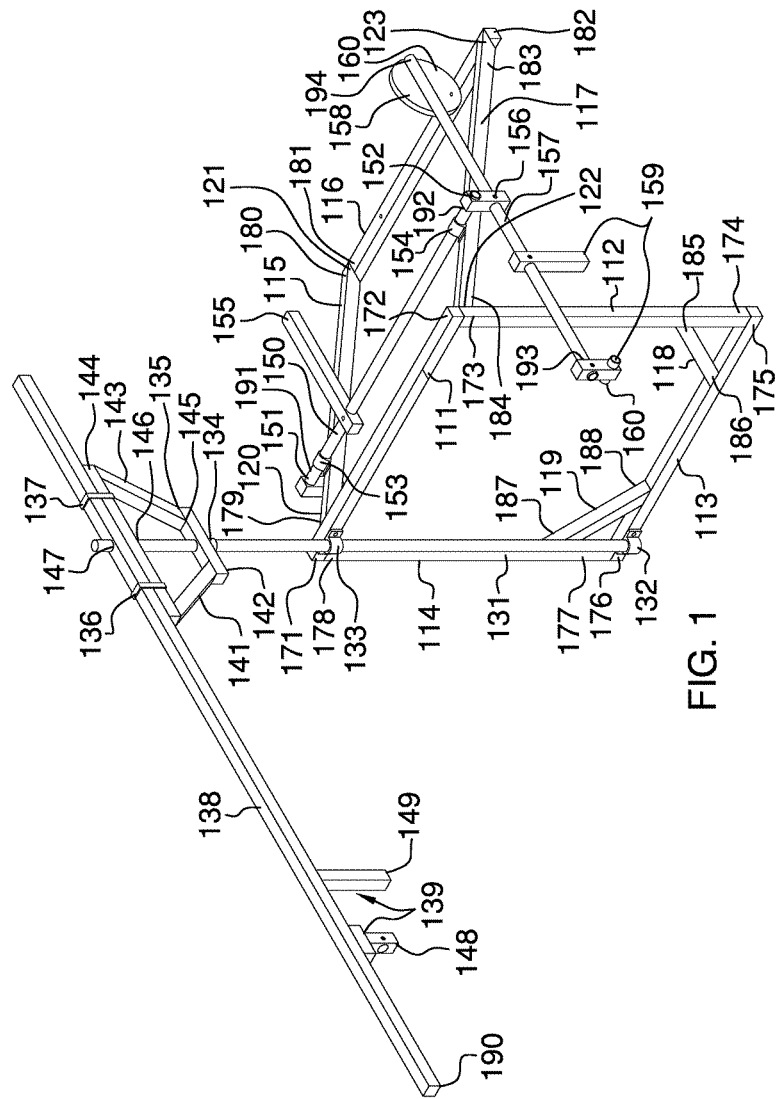
FIG. 1 is a perspective view of an embodiment of the disclosure.
Figure 2:
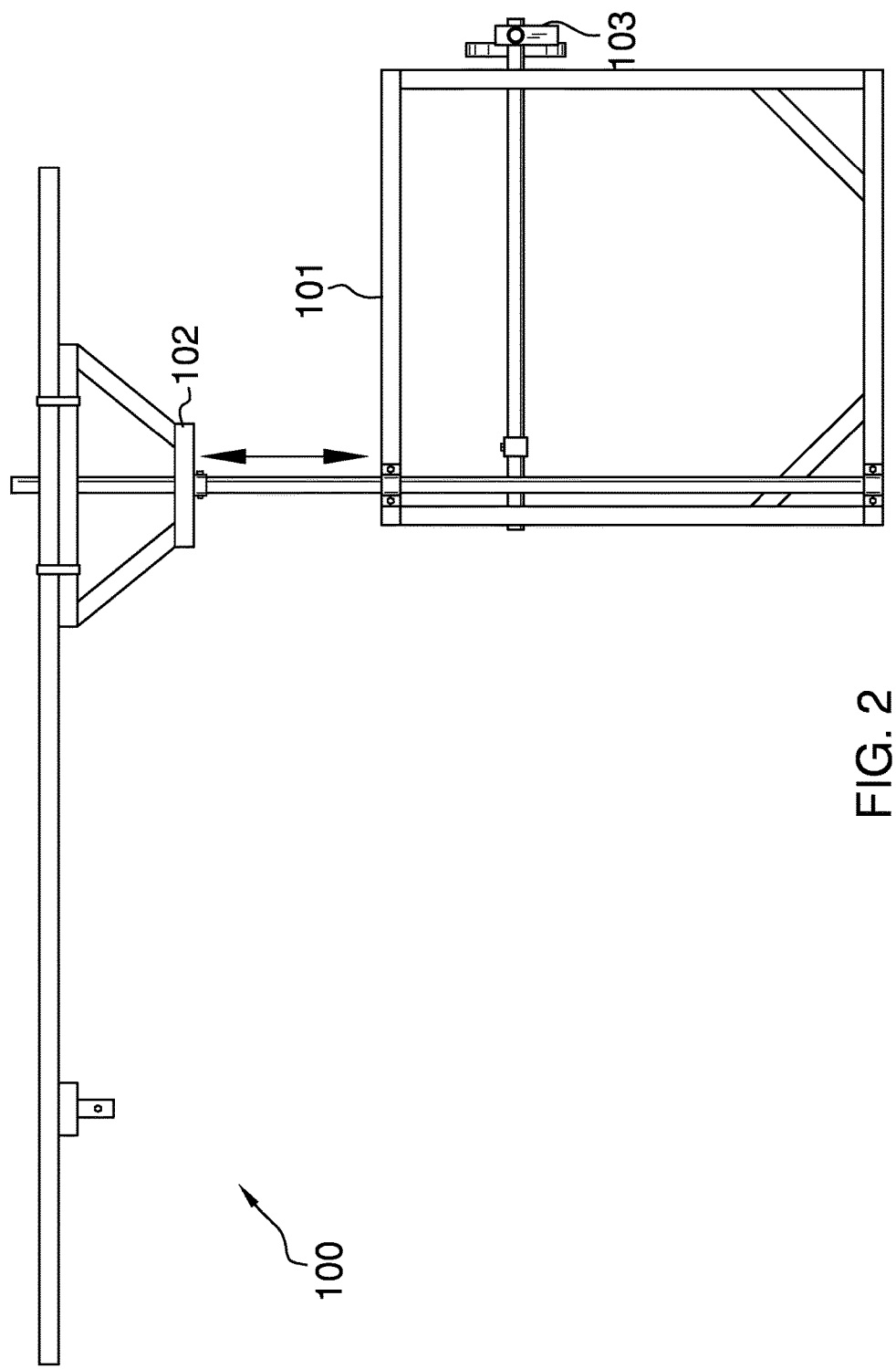
FIG. 2 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, theory presented in the preceding technical field, background, brief summary or the following detailed description.

Detailed reference will now be made to a first potential embodiment of the disclosure, which is illustrated in FIGS. 1 through 5. The hedger trimming carriage and apparatus 100 (hereinafter invention) comprises a mounting frame 101, a first hedger apparatus 102, and as second hedger apparatus 103. The invention 100 is adapted for use with a hedger.

The mounting frame 101 mounts on the vehicle 201 and is used to carry the first hedger apparatus 102 and the second hedger apparatus 103. The mounting frame 101 further comprises a first square tube 111, a second square tube 112, a third square tube 113, a fourth square tube 114, a fifth square tube 115, a sixth square tube 116, a seventh square tube 117, an eighth square tube 118, and a ninth square tube 119. The first square tube 111 is a square metal tube that is further defined with a first end 171 and a second end 172. The second square tube 112 is a square metal tube that is further defined with a third end 173 and a fourth end 174. The third square tube 113 is a square metal tube that is further defined with a fifth end 175 and a sixth end 176. The fourth square tube 114 is a square metal tube that is further defined with a seventh end 177 and an eighth end 178. The fifth square tube 115 is a square metal end 180. The sixth square tube 116 is a square metal tube that is further defined with an eleventh end 181 and a twelfth end 182. The seventh square tube 117 is a square metal tube that is further defined with a thirteenth end 183 and a fourteenth end 184. The eighth square tube 118 is a square metal tube that is further defined with a fifteenth end 185 and a sixteenth end 186. The ninth square tube 119 is a square metal tube that is further defined with a seventeenth end 187 and an eighteenth end 188.

The mounting frame 101 is assembled as follows: The first end 171 is attached to the eighth end 178. The second end 172 is attached to the third end 173. The fourth end 174 is attached to the fifth end 175. The sixth end 176 is attached to the seventh end 177. The ninth end 179 is attached to the eighth end 178. The tenth end 180 is attached to the eleventh end 181. The twelfth end 182 is attached to the thirteenth end 183. The fourteenth end 184 is attached to the third end 173. The corner formed by the fourth end 174 and the fifth end 175 is reinforced using the eighth square tube 118 as a cross brace. The fifteenth end 185 end of the eighth square tube 118 is attached to the second square tube 112. The sixteenth end 186 of the eighth square tube 118 is attached to the third square tube 113. The corner formed by the sixth end 176 and the a cross brace. The seventeenth end 187 end of the ninth square tube 119 is attached to the fourth square tube 114. The eighteenth end 188 of the ninth square tube 119 is attached to the third square tube 113. All the attachments described in this paragraphs are made using a technique selected from the group consisting of: welding or the use of commercially available hardware.

Figure 3:
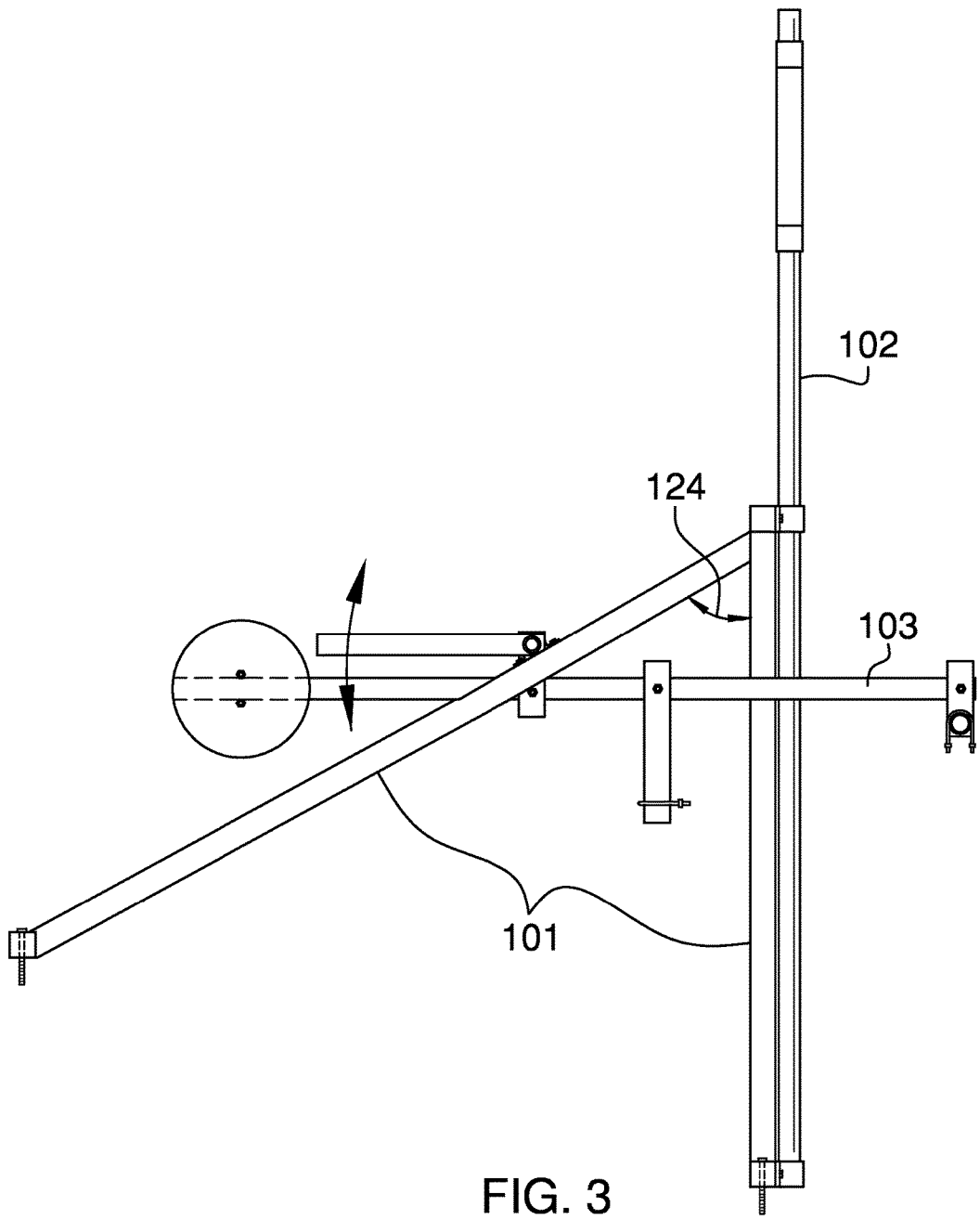
FIG. 3 is a side view of an embodiment of the disclosure.
Figure 4:
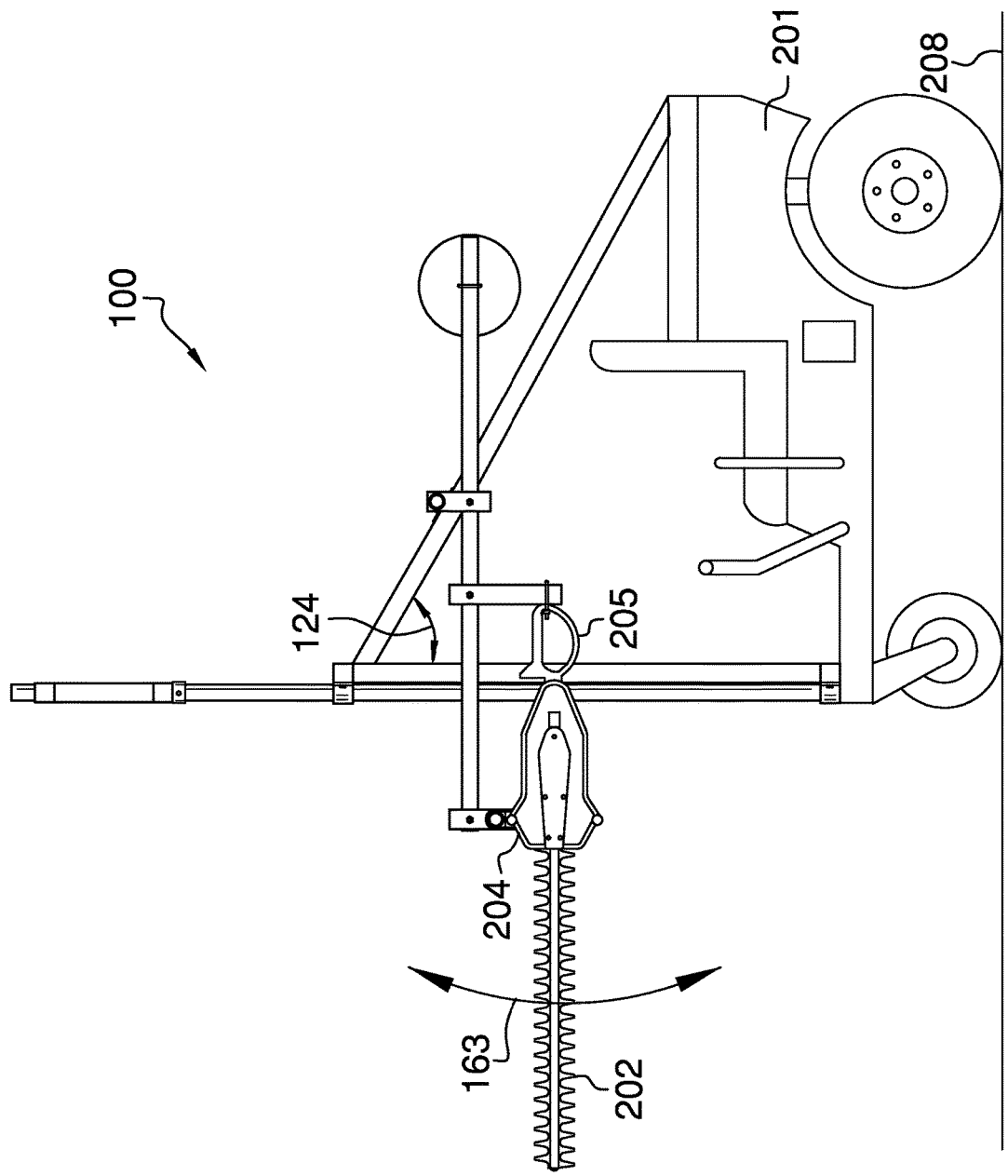
FIG. 4 is an in use view of an embodiment of the disclosure.
Figure 5:
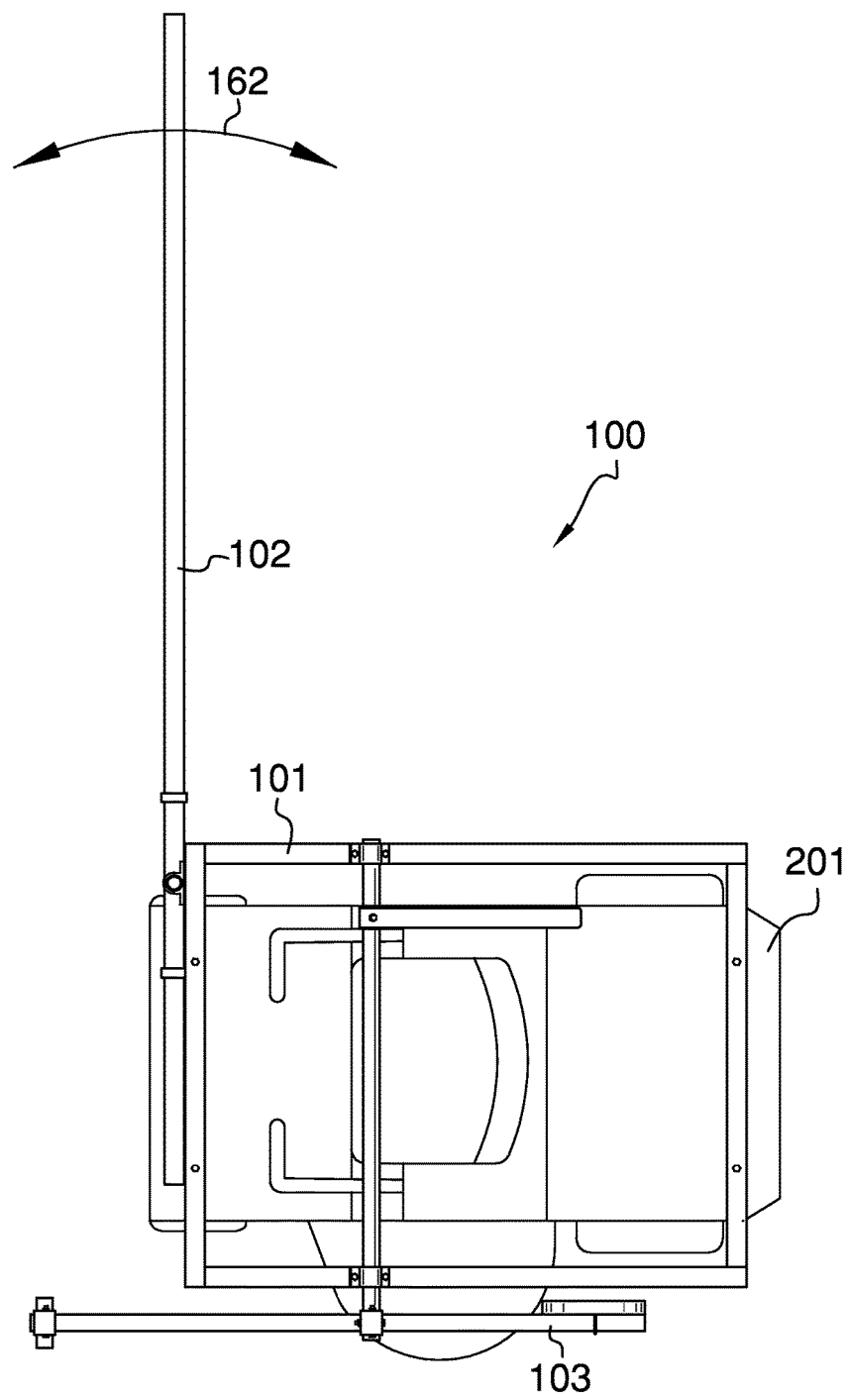
FIG. 5 is a top view of an embodiment of the disclosure.

As shown most clearly in FIGS. 3 and 4, the structure formed by the fifth square tube 115, sixth square tube 116, and the seventh square tube 117 is attached to the structure formed by the first square tube 111, the second square tube 112, the third square tube 113 and the fourth square tube 114 using an acute angle 124. In normal use the structure formed by the first square tube 111, the second square tube 112, the third square tube 113 and the fourth square tube 114 is positioned such that it is perpendicular to the ground 203. The structure formed by the fifth square tube 115, sixth square tube 116, and the seventh square tube 117 projects away from the structure formed by the first square tube 111, the second square tube 112, the third square tube 113 and the fourth square tube 114 from a position above the head of the driver of the vehicle 201 at an acute angle 124 such that the structure formed by the fifth square tube 115, sixth square tube 116, and the seventh square driver of the vehicle 201. The acute angle 124 is formed from a first cut angle 120 cut into the ninth end 179 of the fifth square tube 115, a second cut angle 121 cut into the tenth end 180 of the fifth square tube 115, a third cut angle 122 cut into the fourteenth end 184 of the seventh square tube 117 and a fourth cut angle 123 cut into the thirteenth end 183 of the seventh square tube 117. The span of the angle of the first cut angle 120 equals the span of the angle of the third cut angle 122. The span of the angle of the second cut angle 121 equals the span of the angle of the fourth cut angle 123.

The hedger 202 is mountable on the first hedger apparatus 102. The first hedger apparatus 102 further comprises a stanchion 131, a first pivot 132, a second pivot 133, a first locking collar 134, a support frame 135, a first clamping collar 136, a second clamping collar 137, a first rotatable arm 138 and a first hedger mount 139. The stanchion 131 raises the first rotatable arm 138 above the vehicle 201. The stanchion 131 is a metal tube that attaches to the first square tube 111 and the third square tube 113 using the second pivot 133 and the first pivot 132 respectively. The first pivot 132 and the second pivot 133 combine to allow the stanchion 131 to rotate around the center axis of the stanchion 131. The first rotatable arm 138 attaches to the stanchion 131 using the support frame 135. The support frame 135 is a structure that is formed in the shape of a trapezoid. The support frame 135 further comprises a first strut 141, a second strut 142, a third strut 143, and a fourth strut 144. The first strut 141, the second strut 142, the third strut 143 and the fourth strut 144 are assembled using a technique selected from the group consisting of: welding or the use of commercially available hardware.

The second strut 142 further comprises a first hole 145 that is sized to receive the stanchion 131. The fourth strut 144 further comprises a second hole 146 that is sized to receive the stanchion 131. The support frame 135 attaches to the stanchion 131 by sliding the stanchion 131 through the first hole 145 and the second hole 146 and is then locked in place using a commercially available first locking collar 134 to hold the support frame 135 in position. The position of the first rotatable arm 138 can be vertically adjusted by loosening the first locking collar 134 and changing the position of the support frame 135 along the stanchion 131. The first rotatable arm 138 is a square metal tube that is further defined with a nineteenth end 189 and a twentieth end 190. The first rotatable arm 138 attaches to the fourth strut 144 of the support frame 135 using the first clamping collar 136 and the second clamping collar 137 such that the nineteenth end 189 is proximal to the support frame 135. The first clamping collar 136 and the second around both the fourth strut 144 and the first rotatable arm 138 to hold them together. The first hedger mount 139 holds the hedger 202 in position. The first hedger mount 139 is positioned proximal to the twentieth end 190 of the first rotatable arm 138. The first hedger mount 139 further comprises a first bracket 148 and a second bracket 149. The first bracket 148 is a commercially available clamp that captures and holds in position the upper handhold 204 of the hedger 202. The second bracket 149 is a commercially available clamp that captures and holds in position the rear handhold 205 of the hedger 202.

The hedger 202 is mountable on the second hedger apparatus 103. The second hedger apparatus 103 further comprises a horizontal rod 150, a first rod pivot 153, a second rod pivot 154, a first rod mount 151, a second rod mount 152, a handle 155, a connector 156, a second rotatable arm 157, a counter weight 158, and a second hedger mount 159. The first rod pivot 153 attaches to the fifth square tube 115. The second rod pivot 154 attaches to the seventh square tube 117 such that the second rod pivot 154 is aligned with the first rod pivot 153. The horizontal rod 150 is a metal shaft that is further defined with a twenty first end 191 and a twenty second end 192. The twenty first end 191 is proximal to the first rod pivot 153. The twenty second end 192 is proximal to the second rod mount 152. The first rod pivot 153 and the second rod pivot 154 allow the horizontal rod 150 to rotate around its center axis. The twenty first end 191 of the horizontal rod 150 attaches to the first rod mount 151. The twenty second end 192 of the horizontal rod 150 attaches to the second rod mount 152. The second rod mount 152 attaches to the connector 156. The connector 156 is a steel tube that is used to connect the horizontal rod 150 to the second rotatable arm 157.

The second rotatable arm 157 is further defined by a twenty third end 193 and a twenty fourth end 194. The counter weight 158 is attached to the twenty fourth end 194 of the second rotatable arm 157. The second hedger mount 159 is positioned proximal to the twenty third end 193. The second hedger mount 159 further comprises a third bracket 160 and a fourth bracket 161. The third bracket 160 is a commercially available clamp that captures and holds in position the upper handhold 204 of the hedger 202. The fourth bracket 161 is a commercially available clamp that captures and holds in position the rear handhold 205 of the hedger 202. A handle 155 is attached to the horizontal rod 150 to allow for the horizontal rod 150 to be rotated by the driver of the vehicle 201.

To use the invention 100, a hedger 202 is mounted to the first hedger mount 139 or the second hedger mount 159 depending on what needs to be trimmed. The first hedger mount 139 is designed to hold hedger 202 such that the cutting edges of the hedger 202 is parallel to the ground 203. The first locking collar 134 is positioned to place the hedger 202 at the appropriate height. The first plane of rotation 162 of the first rotatable arm 138 is parallel to the plane of the ground 203. This allows the first rotatable arm 138 to be rotated to cut the top of a bush, shrub, or hedge. To use the invention 100 when the hedger 202 is mounted to the first hedger mount 139, the driver of the vehicle 201 turns on the hedger 202, rotates the first rotatable arm 138 into position and drives next to the bush, shrub, or hedge to be trimmed.

The second hedger mount 159 is designed to hold hedger 202 such that the cutting edges of the hedger 202 is perpendicular to the ground 203. The second plane of rotation 163 of the second rotatable arm 157 is perpendicular to the plane to of the ground 203. This allows the second rotatable arm 157 to be rotated to cut the front of a bush, shrub, or hedge. To use the invention 100 when the hedger 202 is mounted to the second hedger mount 159, the driver of the vehicle 201 turns on the hedger 202 and then rotates the handle 155 to rotate the horizontal rod 150 such that the hedger 202 moves up and down. The driver of the vehicle 201 then drives next to the bush, The components described in this invention 100 are all commercially available. Where available, the use of steel, iron, or aluminum components is preferred.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Hedger: As used in this disclosure, a hedger is a tool that is used to trim hedges, bushes, and shrubs. Hedge trimmer is a synonym.

Vehicle: As used in this disclosure, a vehicle is a device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An apparatus comprising:
a mounting frame, a first hedger apparatus, and a second hedger apparatus;
wherein the apparatus is adapted to be mounted on a vehicle;
wherein the apparatus is adapted for use with a hedger;
wherein the hedger can be mounted to cut in a first plane of rotation;
wherein the hedger can be mounted to cut in a second plane of rotation;
wherein the second plane of rotation is perpendicular to the first plane of rotation;
wherein the hedger can be vertically adjusted;
wherein the hedger can be mounted to cut in a vertical plane;
wherein the mounting frame further comprises a first square tube, a second square tube, a third square tube, a fourth square tube, a fifth square tube, a sixth square tube, a seventh square tube, an eighth square tube, and a ninth square tube;
wherein the first hedger apparatus further comprises a stanchion, a first pivot, a second pivot, a first locking collar, a support frame, a first clamping collar, a second clamping collar, a first rotatable arm and a first hedger mount;
wherein the second hedger apparatus further comprises a horizontal rod, a first rod pivot, a second rod pivot, a first rod mount, a second rod mount, a handle, a connector, a second rotatable arm, a counter weight, and a second hedger mount;
wherein the first square tube is a metal tube that is further defined with a first end and a second end;
wherein the second square tube is a metal tube that is further defined with a third end and a fourth end;
wherein the third square tube is a metal tube that is further defined with a fifth end and a sixth end;
wherein the fourth square tube is a metal tube that is further defined with a seventh end and an eighth end;
wherein the fifth square tube is a metal tube that is further defined with a ninth end and a tenth end;
wherein the sixth square tube is a metal tube that is further defined with an eleventh end and a twelfth end;
wherein the seventh square tube is a metal tube that is further defined with a thirteenth end and a fourteenth end;
wherein the eighth square tube is a metal tube that is further defined with a fifteenth end and a sixteenth end;
wherein the ninth square tube is a metal tube that is further defined with a seventeenth end and an eighteenth end.

2. The apparatus according to claim 1 wherein the first end is attached to the eighth end;
wherein second end is attached to the third end;
wherein the fourth end is attached to the fifth end;
wherein the sixth end is attached to the seventh end;
wherein the ninth end is attached to the eighth end;
wherein the tenth end is attached to the eleventh end;
wherein the twelfth end is attached to the thirteenth end;
wherein the fourteenth end is attached to the third end;
wherein the fifteenth end is attached to the second square tube;
wherein the sixteenth end is attached to the third square tube;
wherein the seventeenth end is attached to the fourth square tube;
wherein the eighteenth end of the ninth tube is attached to the third square tube.

3. The apparatus according to claim 1 wherein the fifth square tube, sixth square tube, and the seventh square tube are collectively attached at an acute angle to the first square tube, the second square tube, the third square tube and the fourth square tube.

4. The apparatus according to claim 3 wherein the structure formed by the first square tube, the second square tube, the third square tube and the fourth square tube are collectively perpendicular to the ground.

5. The apparatus according to claim 4 wherein the fifth square tube, sixth square tube, and the seventh square tube projects away from the first square tube, the second square tube, the third square tube and the fourth square tube at the acute angle.

6. The apparatus according to claim 5 wherein the fifth square tube, sixth square tube, and the seventh square tube are collectively attached to the first square tube, the second square tube, the third square tube and the fourth square tube at a position that is adapted to be above the head of the driver of the vehicle.

7. The apparatus according to claim 6 wherein the fifth square tube, sixth square tube, and the seventh square tube are collectively adapted to be attached to the vehicle at a position that is adapted to be located behind the driver of the vehicle.

8. The apparatus according to claim 7 wherein the stanchion is adapted to raise the first rotatable arm above the vehicle.

9. The apparatus according to claim 8 wherein the first locking collar is used to vertically adjust the position of the rotatable arm on the stanchion.

10. The apparatus according to claim 9 wherein the stanchion is attached to the first square tube and the third square tube using the second pivot and the first pivot;

wherein first rotatable arm attaches to the stanchion using the support frame;

wherein first support frame is a structure that is formed in the shape of a trapezoid;

wherein the support frame further comprises a first hole and a second hole;

wherein the support frame attaches to the stanchion by sliding the stanchion through the first hole and the second hole;

wherein the support frame is then locked in place using the first locking collar;

wherein the first rotatable arm is a metal tube;

wherein the first rotatable arm attaches to the support frame;

wherein the first hedger mount attaches to the first rotatable arm;

wherein the first hedger mount further comprises a first bracket and a second bracket.

11. The apparatus according to claim 10 wherein the first rod pivot attaches to the fifth square tube;

wherein the second rod pivot attaches to the seventh square tube such that the second rod pivot is aligned with the first rod pivot;

wherein the horizontal rod is a metal shaft;

wherein the first rod pivot and the second rod pivot are attached to the horizontal rod;

wherein the first rod pivot and the second rod pivot allow the horizontal rod to rotate around a center axis of the horizontal rod.

12. The apparatus according to claim 11 wherein the connector is a structure that is used to connect the horizontal rod to the second rotatable arm;

wherein the counter weight is attached to the second rotatable arm;

wherein the second hedger mount is attached to the second rotatable arm;

wherein the second hedger mount further comprises a third bracket and a fourth bracket.

13. The apparatus according to claim 12 wherein the handle is attached to the horizontal rod.

\* \* \* \* \*